(12) United States Patent
Watanabe et al.

(10) Patent No.: US 9,113,067 B2
(45) Date of Patent: *Aug. 18, 2015

(54) IMAGING APPARATUS, CONTROL APPARATUS, CONTROL METHOD THEREFOR, AND RECORDING MEDIUM

(71) Applicant: CANON KABUSHIKI KAISHA, Tokyo (JP)

(72) Inventors: Hajime Watanabe, Tokyo (JP); Hideaki Ohshima, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/163,388

(22) Filed: Jan. 24, 2014

(65) Prior Publication Data

US 2014/0184831 A1 Jul. 3, 2014

Related U.S. Application Data

(63) Continuation of application No. 13/861,853, filed on Apr. 12, 2013, now Pat. No. 8,693,859, which is a continuation of application No. 12/859,167, filed on Aug. 18, 2010, now Pat. No. 8,433,186.

(30) Foreign Application Priority Data

Aug. 27, 2009 (JP) ................... 2009-196970

(51) Int. Cl.
*G03B 17/00* (2006.01)
*H04N 5/232* (2006.01)
*H04W 76/06* (2009.01)

(52) U.S. Cl.
CPC ............ *H04N 5/23206* (2013.01); *G03B 17/00* (2013.01); *H04N 5/23203* (2013.01); *H04W 76/06* (2013.01)

(58) Field of Classification Search
CPC ...................................................... G03B 17/38
USPC ........................................................... 396/56
See application file for complete search history.

(56) References Cited

U.S. PATENT DOCUMENTS 8,433,186 B2 * 4/2013 Watanabe et al. ............... 396/56
8,693,859 B2 * 4/2014 Watanabe et al. ............... 396/56
(Continued)

FOREIGN PATENT DOCUMENTS

| JP | 2005-252568 A | 9/2005 |
| JP | 2006-135549 A | 5/2006 |
| JP | 2009-188680 A | 8/2009 |

OTHER PUBLICATIONS

Office Action issued on Sep. 10, 2013, in counterpart Japanese Patent Application No. 2009-196970.

*Primary Examiner* — Clayton E LaBalle
*Assistant Examiner* — Dennis Hancock
(74) *Attorney, Agent, or Firm* — Carter, DeLuca, Farrell & Schmidt, LLP

(57) ABSTRACT

An imaging apparatus receives a signal regularly transmitted from a control apparatus, determines whether or not the imaging apparatus is disconnected from the network based on a status of the reception of the signal, transmits a request for participation in the network to the control apparatus according to a determination that the imaging apparatus is disconnected from the network to notify the control apparatus that the imaging apparatus is disconnected from the network, and participates in the network after the control apparatus receives the request for participation.

17 Claims, 10 Drawing Sheets

(56) References Cited

U.S. PATENT DOCUMENTS

| | | |
|---|---|---|
| 2003/0012566 A1 | 1/2003 | Kindaichi |
| 2006/0171453 A1 | 8/2006 | Rohlfing et al. |
| 2007/0147815 A1* | 6/2007 | Tanaka .......................... 396/56 |
| 2007/0223901 A1* | 9/2007 | Fujimoto ....................... 396/56 |
| 2009/0189981 A1 | 7/2009 | Siann et al. |
| 2009/0325493 A1 | 12/2009 | Suzuki |
| 2010/0259682 A1 | 10/2010 | Unger |

* cited by examiner

FIG.4

| TYPE | NICKNAME | ADDRESS | STATUS |
|---|---|---|---|
| MASTER | Master | 192.168.1.1 | IDLE |
| SLAVE | Slave1 | 192.168.1.2 | IDLE |
| SLAVE | Slave2 | 192.168.1.3 | IDLE |
| SLAVE | Slave3 | 192.168.1.4 | IDLE |

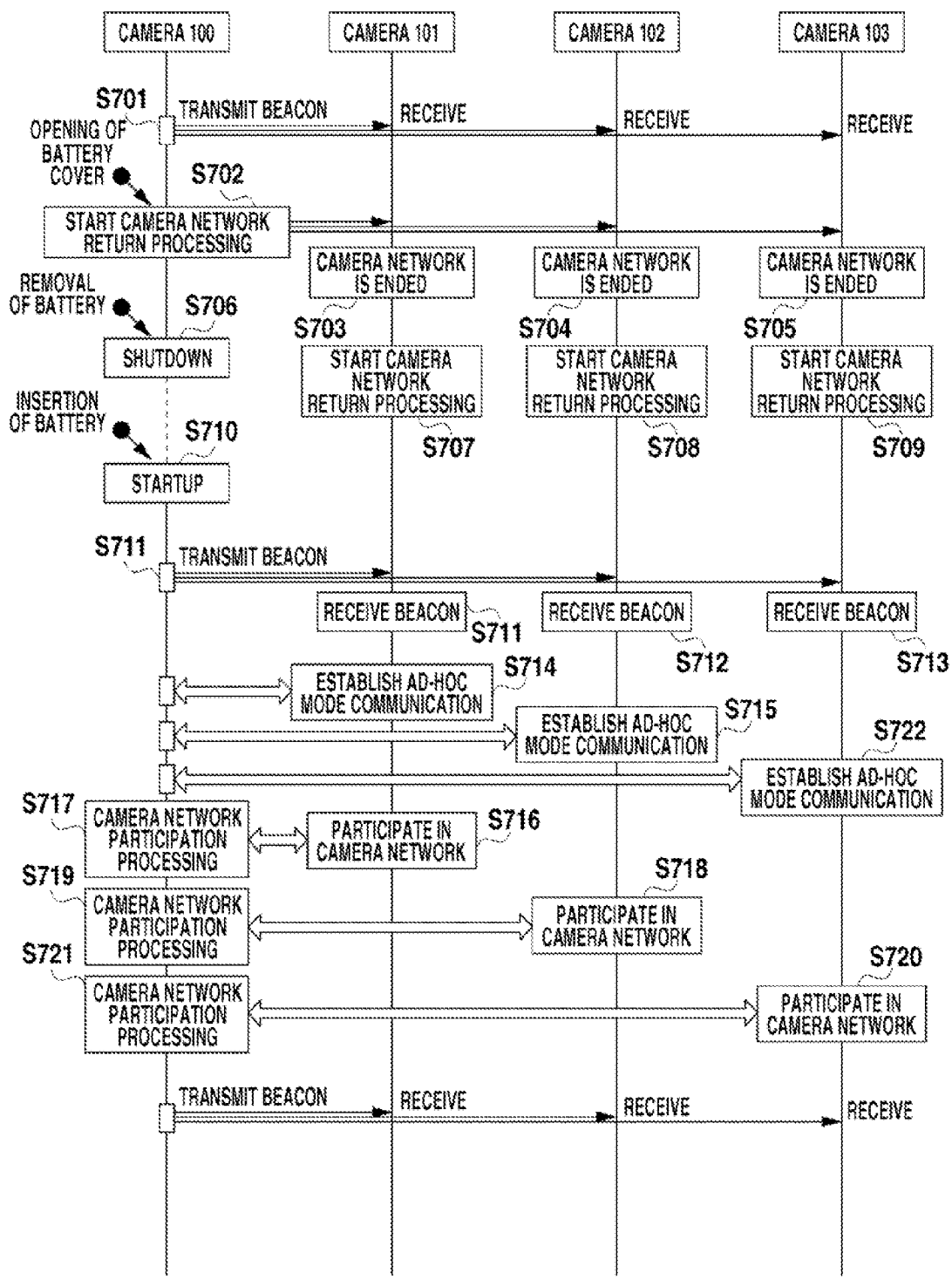

FIG.8A (DISCONNECTION FROM CAMERA NETWORK)

> DISCONNECTED FROM CAMERA NETWORK
> [OK]

FIG.8B    FIG.8C (IN THE PROCESS OF CAMERA NETWORK CONNECTION)

FIG.8B:
> SLAVE 1 IS REQUESTING PARTICIPATION IN CAMERA NETWORK
> [OK]

FIG.8C:
> MASTER
> YOU ARE REQUESTING PARTICIPATION IN CAMERA NETWORK
> [OK]

FIG.8D    FIG.8E (COMPLETION OF CAMERA NETWORK CONNECTION)

FIG.8D:
> SLAVE 1 PARTICIPATES IN CAMERA NETWORK
> [OK]

FIG.8E:
> MASTER
> YOU PARTICIPATE IN CAMERA NETWORK
> [OK]

SCREEN DISPLAY AT MASTER CAMERA    SCREEN DISPLAY AT SLAVE CAMERA

IMAGING APPARATUS, CONTROL APPARATUS, CONTROL METHOD THEREFOR, AND RECORDING MEDIUM

CROSS REFERENCE TO RELATED APPLICATIONS

This application is a continuation of U.S. patent application Ser. No. 13/861,853, filed Apr. 12, 2013, which is a continuation of U.S. Pat. No. 8,433,186, filed Aug. 18, 2010, which claims the benefit of and priority to Japanese Patent Application No. 2009-196970, filed Aug. 27, 2009, the entire contents of each of which are hereby incorporated by reference herein in their entirety.

BACKGROUND OF THE INVENTION

1. Field of the Invention

The present invention relates to a technique for controlling an imaging apparatus equipped with a wireless communication means.

2. Description of the Related Art

Conventionally, there has been a camera system in which cameras having different photographing conditions to a subject and different angles set thereto are configured so that they can operate in a coordinated manner with use of a communication means such as a communication cable or a wireless communication apparatus.

For example, "Japanese Patent Application Laid-Open No. 2005-252568" discusses a camera system in which a plurality of imaging apparatuses can be operated to capture a subject image with use of a single control apparatus through wireless communication, and the captured image data can be displayed at the control apparatus.

However, although the system discussed in "Japanese Patent Application Laid-Open No. 2005-252568" is easy to handle since the apparatuses therein do not have to be connected through a communication cable, a situation causing an increase in the distance between the apparatuses often occurs, which may result in a wireless communication failure therebetween despite the user's intention.

When wireless communication becomes impossible in this way, it is troublesome for a user to operate all of the remotely deployed apparatuses to reestablish a wireless network.

SUMMARY OF THE INVENTION

According to an aspect of the present invention, an imaging apparatus configured to wirelessly establish a network with a control apparatus, the imaging apparatus includes a reception unit configured to receive a signal from the control apparatus, a determination unit configured to determine whether or not the imaging apparatus is disconnected from the network based on a reception status of the signal, and a transmission unit configured to transmit a request for participation in the network to the control apparatus to notify the control apparatus that the imaging apparatus is disconnected from the network, according to a determination that the imaging apparatus is disconnected, wherein the imaging apparatus participates in the network after the request for participation is received.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 illustrates a management table of a camera network according to the first exemplary embodiment.

FIG. 7 is a sequence diagram illustrating processing for returning to a camera network according to a second exemplary embodiment.

FIG. 8A to FIG. 8E illustrate screen displays in a camera system according to the second exemplary embodiment.

DESCRIPTION OF THE EMBODIMENTS

Various exemplary embodiments, features, and aspects of the invention will be described in detail below with reference to the drawings.

(System Configuration)

Figure 1A:
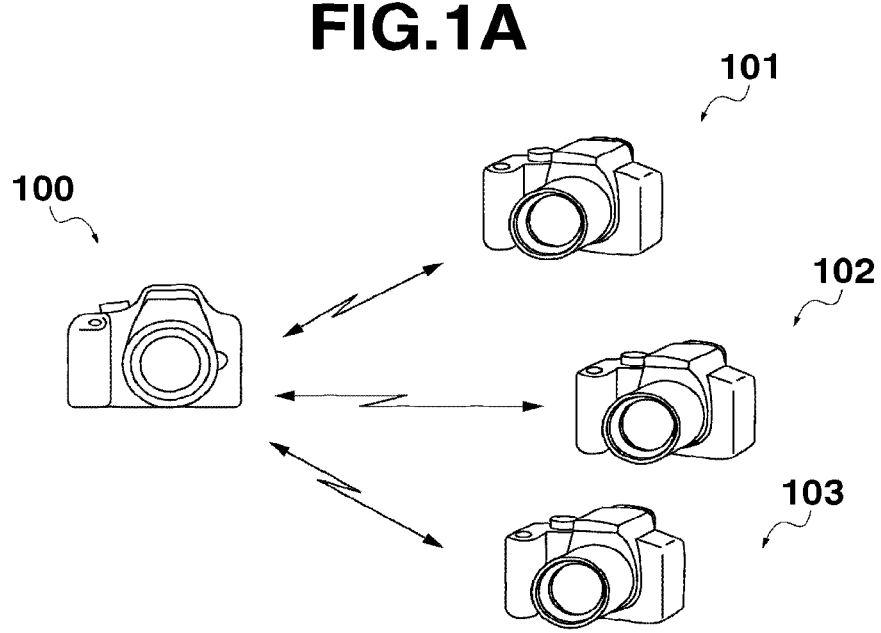
FIGS. 1A and 1B illustrate configurations of camera systems.
Figure 1B:
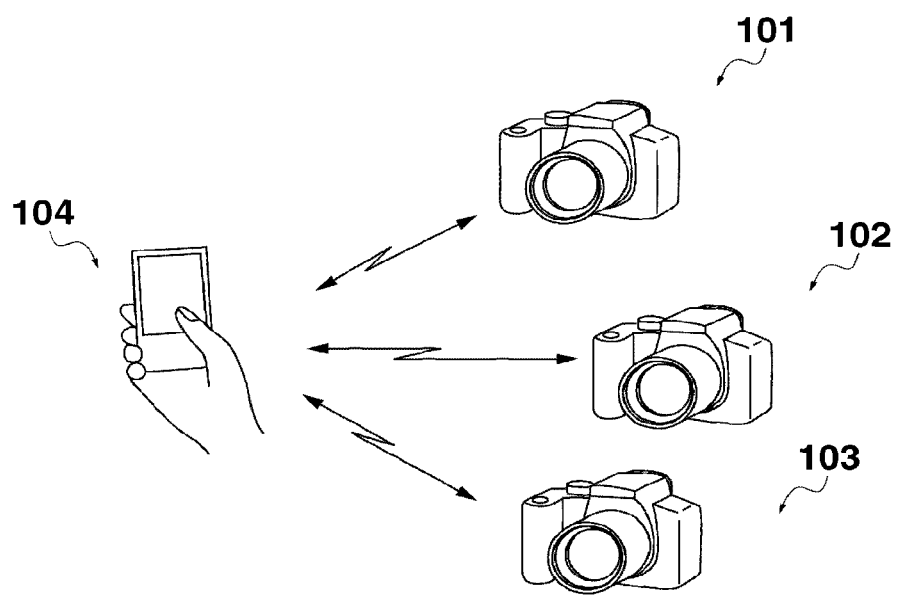

Hereinafter, a description will be given by taking an imaging apparatus as an example of a wireless communication apparatus. Examples of imaging apparatus include an interchangeable-lens digital still camera, a lens-integrated digital still camera, and a digital video camera. FIGS. 1A and 1B illustrate configurations of camera systems including imaging apparatuses (hereinafter referred to as "camera") according to a first exemplary embodiment.

FIG. 1A illustrates a camera system employing a camera as a control apparatus. In the camera system illustrated in FIG. 1A, a plurality of cameras (four cameras in FIG. 1A) equipped with a wireless communication unit constitute a camera network established through wireless communication. The wireless communication in the present exemplary embodiment is wireless communication in the ad-hoc mode under the IEEE802.11 standard, however, another wireless communication method may be employed.

A camera 100 in FIG. 1A is set as a master camera, which operates as a control apparatus for controlling the other cameras. Cameras 101 to 103 are set as slave cameras, which operate as control target apparatuses to be controlled by the control apparatus.

When a user operates the master camera 100, a control signal is transmitted from the master camera 100 to the slave cameras 101 to 103 through wireless communication, and it is possible to control the slave cameras 101 to 103. In the present exemplary embodiment, when a shooting operation is performed at the master camera 100, a signal for instructing a shooting is simultaneously transmitted to the slave cameras 101 to 103, whereby the slave cameras 101 to 103 are controlled to perform a shooting operation in conjunction with the master camera 100.

FIG. 1B illustrates, as another system configuration example, a configuration employing a remote controller 104 equipped with a wireless communication unit as a control apparatus. In this example, the remote controller 104 is connected with a plurality of cameras (three cameras in the example illustrated in FIG. 1B) equipped with a wireless communication unit through wireless communication to establish a camera network. A user can control the slave cameras 101 to 103 by operating the remote controller 104.

In the present exemplary embodiment, which will be described below, the control apparatus is embodied by a camera, as illustrated in FIG. 1A.

(Hardware Configuration)

Figure 2:
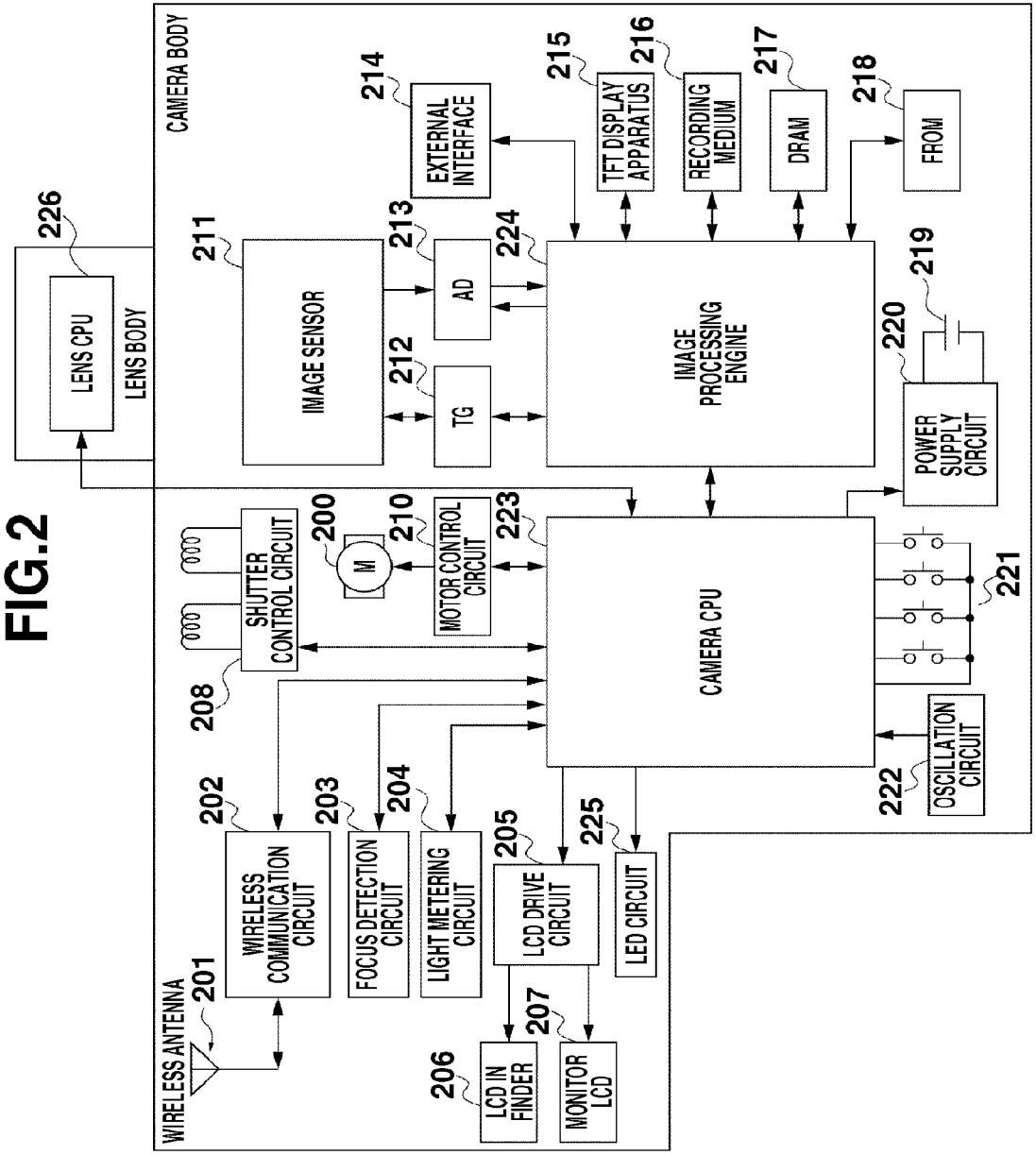
FIG. 2 is a block diagram illustrating a configuration of a camera body.

FIG. 2 is a schematic block diagram illustrating a configuration of the camera 100. A camera central processing unit (CPU) 223 is a main CPU controlling the camera 100, and controls the respective units of the camera 100 according to the input signals from the respective units and programs. More specifically, the camera CPU 223 performs, for example, a power supply control, a switch control, a lens control, a light metering control, a distance measurement control, a shutter control, and a wireless communication control.

A power supply circuit 220 and a switch array 221 are connected to the camera CPU 223. The switch array 221 includes, for example, a SW1 and SW2, which are a release button, and operation members for operating graphical user interfaces (GUIs), which will be described later. Further, for example, an oscillation circuit 222, a wireless communication circuit 202, a focus detection circuit 203, a light metering circuit 204, a liquid crystal display (LCD) drive circuit 205, a shutter control circuit 208, a motor control circuit 209, and an image processing engine 224 are connected to the camera CPU 223.

The camera 100 in the present exemplary embodiment communicates a signal with an interchangeable photographic lens, in particular, with a lens CPU 226 disposed in the lens as a lens control circuit through a mount contact. The focus detection circuit 203, according to a signal of the camera CPU 223, performs a storage control and a readout control of a distance measurement sensor, outputs each pixel information to the camera CPU 223, and performs focus detection by the known phase difference detection method. The camera CPU 223 performs focus adjustment (auto focus (AF)) of the lens by exchanging a signal with the lens CPU 226, based on the focus detection information.

The light metering circuit 204 transmits a luminance signal output from a light metering sensor to the camera CPU 223 as a luminance signal of a subject, and performs an exposure calculation (auto exposure (AE)) including a known aperture value calculation and shutter speed calculation.

The shutter control circuit 208, according to a signal from the camera CPU 223, controls two shutter drive magnets constituting a focal plane shutter to cause shutter curtains to travel, thereby controlling an exposure operation.

The SW1 is turned on by a first stroke of the release button, and serves as a switch to start AE and AF operations. The SW2 is turned on by a second stroke of the release button, and serves as a switch to start an exposure operation. Signals from the SW1 and SW2, and other operation members of the camera are detected by the camera CPU 223.

The LCD drive circuit 205 controls display on an LCD 206 in the finder and a monitor LCD 207 according to a signal from the camera CPU 223.

The image processing engine 224 is a processor mainly in charge of digital image processing, and performs a storage control and a readout control of an image sensor 211 through a timing generator (TG) 212.

A readout image signal is converted from an analog signal to a digital signal by an AD converter 213, and undergoes image processing such as known color compensation processing, white balance processing, and gamma processing. Finally, the image signal is converted into digital image data in, for example, the Joint Photographic Experts Group (JPEG) format to be temporarily stored in a dynamic random access memory (DRAM) 217 as well as is displayed at a thin-film transistor (TFT) display apparatus 215 for a quick review, and then is stored in a recording medium 216.

Further, graphical user interfaces (GUIs) for performing settings for the camera are displayed on the TFT display apparatus 215. The GUIs are provided to perform, for example, various settings for the camera, wireless communication settings, settings as a master camera or a slave camera, and network settings with use of the operation members included in the switch array 221.

An LED drive circuit 225 controls LEDs, which indicate a connection status to the camera network. As will be described below, the LED drive circuit 225 controls a green LED according to a signal from the camera CPU 223 in such a manner that the green LED blinks during the settings for participation in the camera network, and lights up upon completion of the procedure for participation in the camera network. Further, the LED drive circuit 225 controls a red LED according to a signal from the camera CPU 223 in such a manner that the red LED lights up to indicate that the camera is disconnected from the camera network for some reason after the completion of the participation in the camera network. A battery 219 supplies required power to the camera body through the power supply circuit 220.

The control of the camera in the present exemplary embodiment may be performed by one hardware unit. Alternatively, a plurality of hardware units may share the processing, whereby the plurality of hardware units may cooperate to function as a means for realizing the respective functions.

The slave cameras 101 to 103 have the same configuration as the configuration illustrated in FIG. 2. The cameras 100 to 103 exchange a wireless communication packet through wireless communication antennas 201, whereby a control signal is exchanged between the master camera 100 and the slave cameras 101 to 103.

(Network Establishment Processing)

Figure 3A:
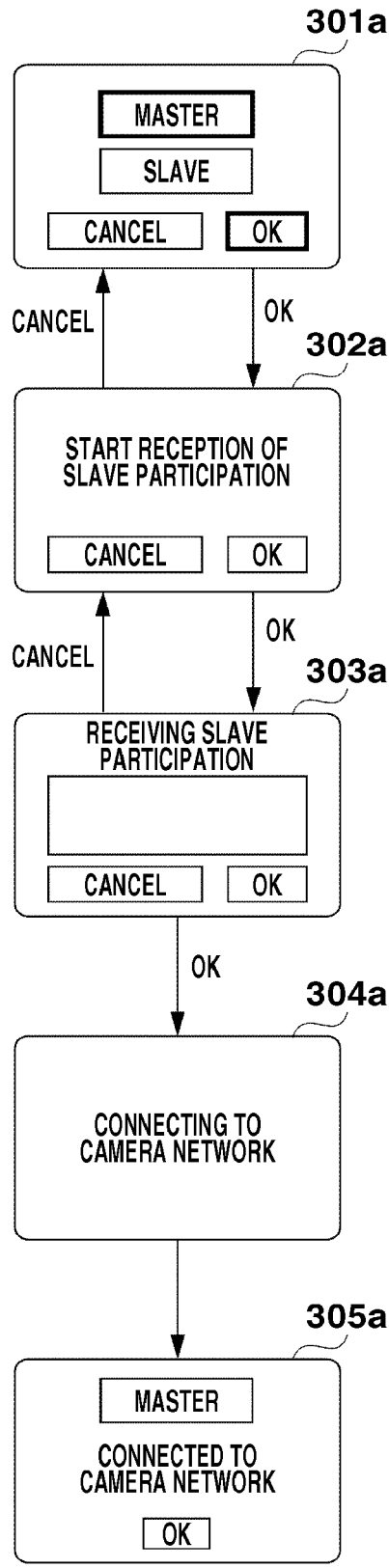
FIGS. 3A and 3B illustrate screen transitions in a camera system according to a first exemplary embodiment.
Figure 3B:
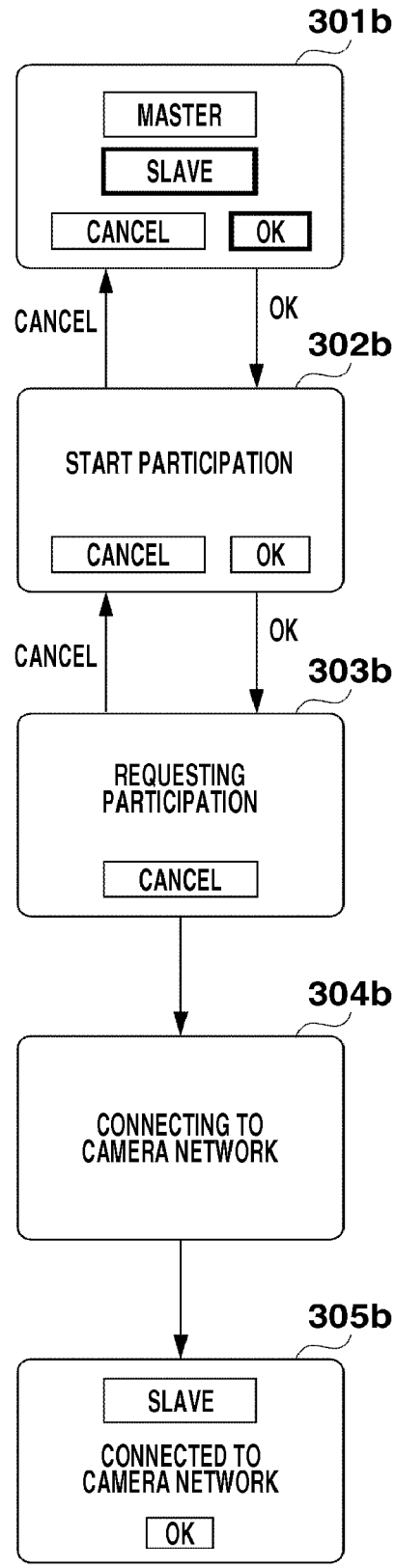

Next, the processing for establishing the camera network will be described. FIG. 3A illustrates a screen transition at the master camera 100, which serves as a control apparatus. FIG. 3B illustrates a screen transition at the slave cameras 101 to 103.

A user at each camera operates a menu screen and other interfaces by operating an operation unit, and causes a setting screen to be displayed on the monitor LCD 207. Upon display of the setting screen, the LED drive circuit 225 controls the green LED to blink.

First, as illustrated in screens 301a and 301b, the setting screen shows GUIs for a selection whether the camera is used as a master camera or as a slave camera. In the screen 301a, the master camera button is enclosed by a heavy line, indicating that the master camera is selected. In the screen 301b, the slave camera button is enclosed by a heavy line, indication that the slave camera is selected. When the OK button is selected at the screen 301a and 301b, the selection of master/slave is applied, and the screen 302a is displayed at the camera where the master camera is selected while the screen 302b is displayed at the camera where the slave camera is selected.

The screen 302a is a screen for starting reception of participation of the slave cameras 101 to 103. When the OK button is selected by a user's operation at the screen 302a, the screen 303a is displayed to indicate that the master camera 100 is now waiting participation of the slave cameras 101 to 103, and the master camera 100 enters a wait status for reception of participation requests from the slave cameras 101 to 103.

On the other hand, the screen 302b is a screen for starting participation in the camera network. When the OK button is selected at the screen 302b, the screen 303b appears, and wireless communicant in the ad-hoc mode is established between the slave camera and the master camera 100. For establishing wireless communication in the ad-hoc mode, common values should be set to wireless communication parameters such as a communication channel, network identifier Basic Service Set Identification (BSSID), an encryption method and an encryption key.

It is known how to set common values to the parameters for establishing wireless communication in the ad-hoc mode, and therefore the description thereof is omitted herein. Upon establishment of wireless communication in the ad-hoc mode, the slave camera transmits a request for participation in the camera network. The screen 303b indicates that the slave camera is now requesting participation in the camera network.

If the master camera 100 is in a wait status for reception of a participation request from the slave cameras 101 to 103, i.e., if the master camera 100 is in a status indicated by the screen 303a, the master camera 100 establishes wireless communication in the ad-hoc mode with the slave cameras 101 to 103, and receives a participation request. When the master camera 100 receives a participation request command, the screen 303a shows a list of nicknames of slave cameras 101 to 103, which have transmitted a participation request. The nickname is a name for identifying a camera, and a user of a camera can register an arbitrary name to the camera as a nickname in advance.

A displayed item is not limited to the nickname, and the master camera 100 may be configured so that, for example, a name of a camera model, or a manufacturer's number or a physical address (media access control (MAC) address) unique to a camera is displayed therein. Displaying a list of the slave cameras 101 to 103, which have transmitted a participation request in this way, enables a user of the master camera 100 to recognize whether a desired slave camera has transmitted a participation request.

If the cancel button is selected at the screen 303b, the slave camera cancels the participation request, and returns to the screen 302b. When the slave camera cancels the participation request, the slave camera notifies the master camera 100 of the cancellation of the participation request. When the master camera 100 receives the notification of the participation cancellation, the master camera 100 deletes the slave camera that has notified the master camera 100 of the participation cancellation from the list at the above-mentioned screen 303a. The processing described so far is performed between the master camera 100 and the respective slave cameras 101 to 103, which participate in the camera network.

If the OK button is selected at the screen 303a of the master camera 100, the master camera 100 determines that participation requests from the slave cameras 101 to 103 have been all received, ends the reception of the participation in the camera network, communicates with the respective cameras, and starts connection processing. Then, the master camera 100 displays the screen 304a, which indicates that the master camera 100 is currently performing the connection processing. The slave camera displays the screen 304b upon a start of the communication for the connection processing with the master camera 100.

In the connection processing, the master camera 100 assigns camera network addresses (internet protocol (IP) addresses) enabling the master camera 100 to uniquely manage the respective cameras in the camera network. Further, the protocol start processing for starting the camera network is performed.

Further, in the connection processing, a camera network management table is generated for managing, for example, the nicknames, network addresses, and connection statues to the camera network of the respective cameras, and is stored in a flash read-only memory (FROM) 218. FIG. 4 illustrates an example of the data configuration of the camera network management table stored in the FROM 218.

In the example illustrated in FIG. 4, the status of being disconnected to the camera network is indicated by "IDLE", while the status of being connected to the camera network is indicated by "CONNECT". The camera network management table is generated at the master camera 100 and the respective slave cameras 101 to 103. The master camera 100 generates a table for managing all of the cameras existing in the network. Each of the slave cameras 101 to 103 generates a table for managing only the slave camera itself and the master camera 100. While the camera is in operation, the camera network management table may be temporarily stored in the DRAM 217 and be utilized therefrom.

Upon completion of the connection processing, the master camera 100 displays the screen 305a, and the slave camera displays the screen 305b, and establishment of the camera network is completed. Further, the LED drive circuit 225 controls the green LED to light up according to the instruction from the camera CPU 223. The camera network establishment processing is performed in this way.

(Processing when Wireless Communication Becomes Impossible)

Next, the processing will be described when wireless communication becomes impossible due to, for example, the distance between the master camera 100 and the slave camera or the influence of a disturbance after the camera network is established. In the present exemplary embodiment, the slave camera can check whether or not the slave camera is connected to the camera network by receiving a notification signal (beacon) transmitted from the master camera 100.

In the present exemplary embodiment, a beacon is unidirectionally transmitted from the master camera 100, and the slave camera does not transmit a response to a beacon. That is, the master camera 100 cannot check with use of a beacon whether or not the slave camera is disconnected from the network.

It is possible to configure the system in such a manner that the master camera 100 transmits and receives a command for checking the connection status of each slave camera. However, such a configuration will cause undesirable effects such as an increase in an amount of wireless communication in the case that a large number of slave cameras exist. Therefore, the present exemplary embodiment dose not employ this configuration, and instead, employs the following method.

Now, the processing performed in the case that the slave camera 103 returns to the camera network that the slave camera 103 participated in when the slave camera 103 becomes unable to receive a beacon, will be described with reference to the sequence diagram illustrated in FIG. 5. The following processing is realized by the camera CPUs 223 of the master camera 100 and the slave cameras 101 to 103 performing a control according to the program. The processing illustrated in the other sequence diagrams and the flowcharts is realized in the same way.

In step S501, the master camera 100 regularly transmits beacons, for example, at predetermined time intervals. The slave cameras 101 to 103 confirm that wireless communication in the ad-hoc mode is established by receiving the beacons. Now, it is assumed that the slave camera 103 becomes unable to receive the beacons.

In step S502, when the slave camera 103 detects that the slave camera 103 cannot receive a beacon for a predetermined time, the slave camera 103 determines in step S503 that the slave camera 103 is isolated from the camera network. As is used herein, the isolated status means the status that, although the camera network is not ended by the master camera 100, the slave camera becomes disconnected from the camera network due to, for example, an increase in the distance between the master camera 100 and the slave camera.

In this case, the master camera 100 cannot detect that the slave camera 103 is isolated, and continues the establishment of the camera network with the other slave cameras 101 and 102. If the slave camera cannot receive a beacon predetermined times in a row, this status is also considered as the status that a slave camera cannot receive a beacon for a predetermined time.

In step S503, when the slave camera 103 detects that the slave camera 103 is isolated, the LED drive circuit 225 thereof controls the green LED to be turned off and the red LED to blink.

In step S504, after the detection of the isolated status, the slave camera 103 starts the processing for returning to the camera network. As the procedure of the camera network return processing, firstly, the slave camera 103 tries to establish wireless communication in the ad-hoc mode with the master camera 100, and re-participate in the camera network.

When the problem with the distance to the master camera 100 or the influence of the disturbance is eliminated, the slave camera 103 becomes able to receive a beacon again. It is assumed that, in step S505, the slave camera 103 becomes able to receive a beacon transmitted from the master camera 100.

When the slave camera 103 becomes able to receive a beacon, in step S506, the slave camera 103 reestablishes wireless communication in the ad-hoc mode with the master camera 100 based on the wireless communication parameters set before.

When the slave camera 103 establishes wireless communication in the ad-hoc mode, in step S507, the slave camera 103 transmits a request for participation in the camera network.

When the master camera 100 receives the participation request from the slave camera 103, in step S508, the master camera 100 determines whether or not the received participation request is a participation request from a camera registered in the table by referring to the camera network management table. If the request is a request transmitted from a camera registered in the table, then the master camera 100 performs the processing for connection with the slave camera 103.

At this time, since the slave camera 103 has become unable to receive a beacon and has become isolated, the status of the isolated slave camera 103 remains registered as the connected status in the master camera 100. In other words, the connection status of the slave camera 103 is still registered as "CONNECT" in the table. Therefore, if the status of the slave camera 103 registered in the master camera 100 already indicates that the slave camera 103 is in a connected status, the master camera 100 first cancels this connected status, i.e., changes the status of the slave camera 103 so that it indicates that the slave camera 103 is disconnected, and then performs the connection processing again after that. The above-mentioned processing will be described below in further detail.

When the slave camera 103 finishes the processing for participation in the camera network, the LED drive circuit 225 thereof controls the red LED to be turned off and the green LED to light up.

Figure 6A:
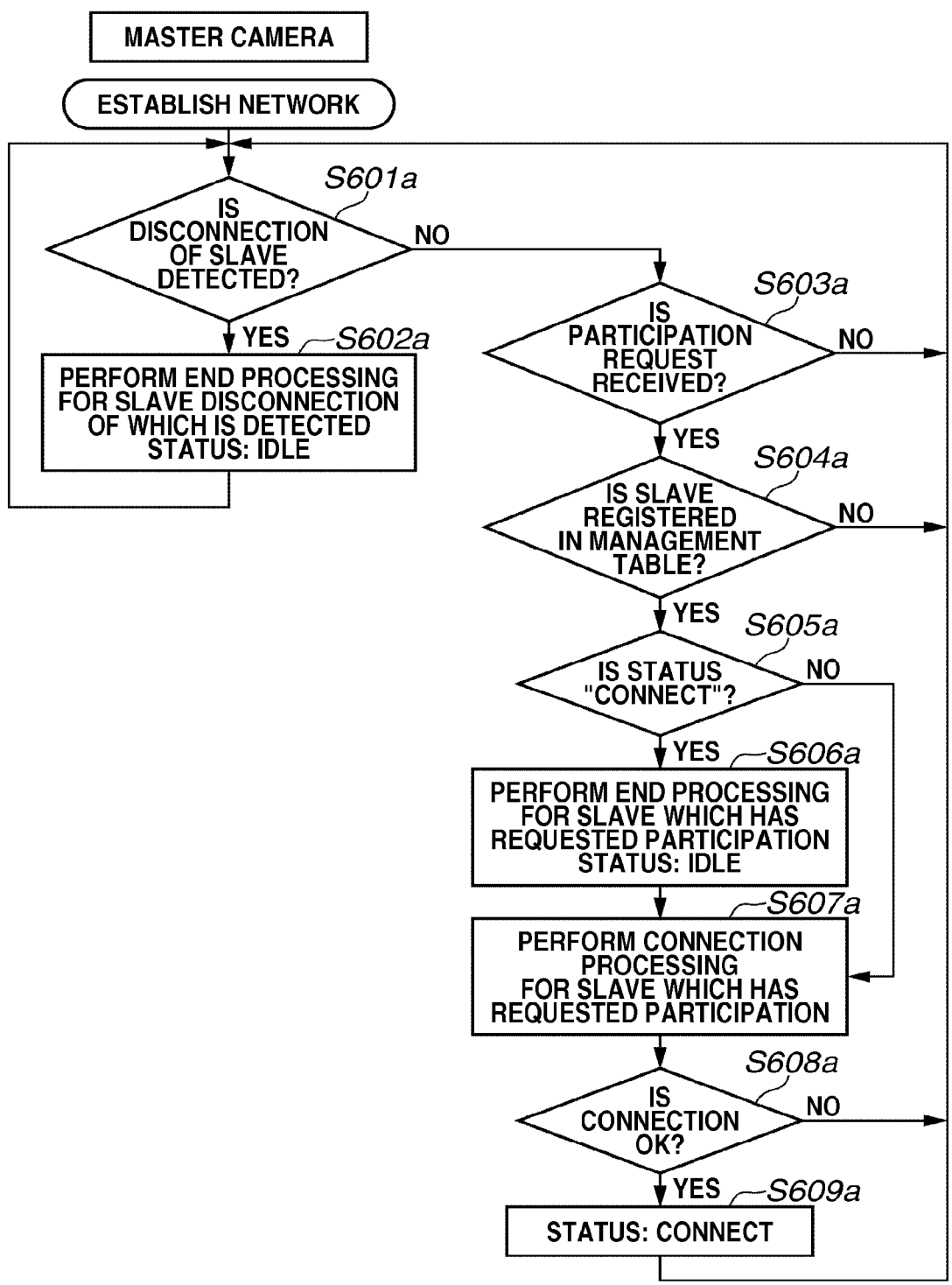
FIGS. 6A and 6B are flowcharts illustrating the processing for returning to the camera network according to the first exemplary embodiment.
Figure 6B:
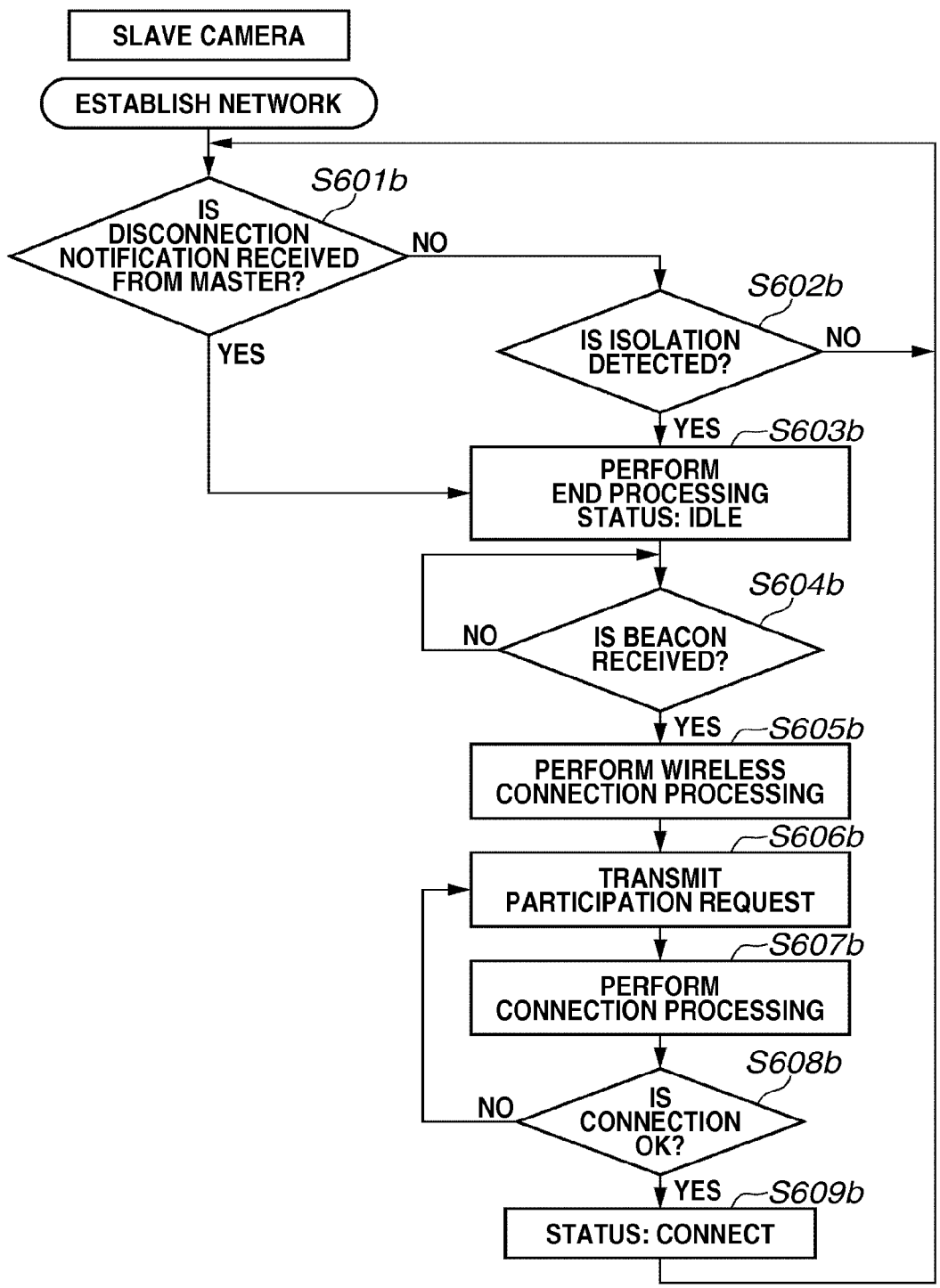

Next, details of the processing from a detection of an isolated status by the slave camera 103 to a return to the camera network will be described, with reference to the flowchart illustrated in FIG. 6. FIG. 6A illustrates the processing at the master camera 100 side, and FIG. 6B illustrates the processing at the slave camera 103 side.

First, the processing at the slave camera 103 side will be described with reference to FIG. 6B. In step S601b, the slave camera 103 determines whether or not the slave camera 103 receives a disconnection notification from the master camera 100. The disconnection notification may be embodied by a disconnection notification under the transmission control protocol (TCP), or a disconnection notification under an upper layer protocol. If the slave camera 103 does not receive a disconnection notification (NO in step S601b), then the slave camera 103 advances the processing to steps S602. If the slave camera 103 receives a disconnection notification (YES in step S601b), then the slave camera 103 advances the processing to step S603b.

Next, in step S602b, the slave camera 103 determines whether or not an isolation of the slave camera 103 is detected. In the present exemplary embodiment, the detection of an isolation is determined if the status of being unable to receive a beacon from the master camera 100 continues although the slave camera 103 does not receive a disconnection notification from the master camera 100. If the slave camera 103 does not detect an isolation (No in step S602b), then the processing by the slave camera 103 returns to step S601b, and steps S601b and S602b are repeated until the slave camera 103 detects a disconnection or an isolation.

In step S603b, the slave camera 103 performs end processing. In particular, the slave camera 103 changes the connection status to "IDLE" in the camera network management table thereof.

When the connection status is changed to "IDLE", the slave camera 103 starts the processing for returning to the camera network. In step S604b, the slave camera 103 waits until the slave camera 103 receives a beacon transmitted from the master camera 100 (NO in step S604b). If the slave camera 103 receives a beacon (YES in step S604b), then the processing by the slave camera 103 proceeds to step S605b.

In step S605b, the slave camera 103 reestablishes wireless communication in the ad-hoc mode based on the recorded wireless communication parameters. If the slave camera 103 succeeds in establishing wireless communication, the slave camera 103 sets the IP address by referring to the camera network management table.

In step S606b, the slave camera 103 transmits a participation request. The participation request is transmitted by broadcast transmission in the camera network. In the present exemplary embodiment, a participation request in this case is transmitted by broadcast transmission, although a participation request may be transmitted by another method that enables transmission to the master camera 100. In this way, the slave camera 103 actively transmits a participation request, whereby it is possible to notify the master camera 100 of the necessity of reconnection to the master camera 100.

After transmitting the participation request, when a connection request is transmitted from the master camera 100, in step S607b, the slave camera 103 accepts the connection request, and completes the connection processing. A time-out of a predetermined time is set as a preparation for the case that the participation request cannot be received by the master camera 100 for some reason. If the slave camera 103 does not receive a connection request from the master camera 100 even after the predetermined time has passed since the participation request was transmitted, the slave camera 103 determines that the time-out has been reached, and ends the processing.

In step S608b, the slave camera 103 determines whether or not the slave camera 103 succeeds in the connection to the master camera 100. If the slave camera 103 succeeds in the connection to the maser camera 100 (YES in step S608b), the processing by the slave camera 103 proceeds to step S609b where the slave camera 103 changes the connection status to "CONNECT" in the camera network management table, and then returns to step S601b. If the slave camera 103 fails in the connection to the master camera 100 (NO in step S608b), the slave camera 103 transmits a participation request again. The slave camera 103 repeats steps S606b to 608b until it succeeds in the connection to the master camera 100. This is the processing that slave camera 103 performs.

Next, the processing that the master camera 100 performs will be described, with reference to FIG. 6A. This processing flow is performed one-on-one for each slave camera.

In step S601a, the master camera 100 determines whether or not the slave camera 103 is disconnected from the camera network. If the slave camera 103 is not disconnected (NO in step S601a), the processing by the master camera 100 proceeds to step S603a. If the slave camera 103 is disconnected (YES in step S601a), the processing by the master camera 100 proceeds to step S602a. It should be noted that disconnection detected here means, for example, the situation that the master camera 100 receives a disconnection notification from one of the slave cameras 101 to 103. The above-mentioned isolation status of the slave camera 103 cannot be detected in this step.

In step S602a, the master camera 100 changes the connection status corresponding to the slave camera disconnection of which is detected to "IDLE" in the camera network management table. Then, the processing by the master camera 100 returns to step S601a.

In step S603a, the master camera 100 determines whether or not the master camera 100 receives a participation request from the slave camera 103. The participation request here means the request transmitted in step S606b in the flowchart of FIG. 6B. If the master camera 100 receives a participation request (YES in step S603a), the processing by the master camera 100 proceeds to step S604a. If the master camera 100 does not receive a participation request (NO in step S603a), the processing by the master camera 100 returns to step S601a, and steps S601a and S603a are repeated until the master camera 100 detects disconnection or a participation request.

In step S604a, the master camera 100 determines whether or not the slave camera 103, which is a sender of the received participation request, is registered in the camera network management table by referring to the camera network management table. If the slave camera 103 is registered in the camera network management table (YES in step S604a), the processing by the master camera 100 proceeds to step S605a. If the slave camera 103 is not registered in the camera network management table (NO in step S604a), the processing by the master camera 100 returns to step S601a. That is, if the slave camera 103 is not registered in the camera network management table, the master camera 100 does not perform the connection processing, and does not accept the participation request.

In step S605a, the master camera 100 determines whether or not the connection status of the slave camera 103, which is a sender of the participation request, is registered as "CONNECT", by referring to the camera network management table. If the corresponding connection status is registered as "CONNECT" (YES in step S605a), the processing by the master camera 100 proceeds to step S606a. If the corresponding connection status is registered as "IDLE" (NO in step S605a), the processing by the master camera 100 proceeds to step S607a.

In step S606a, the master camera 100 determines that the slave camera 103, the connection status of which is registered as "CONNECT", is actually isolated, and cancels the connected status for now. At this time, the master camera 100 changes the corresponding connection status to "IDLE" in the camera network management table.

In step S607a, the master camera 100 performs the connection processing for the slave camera 103 that has transmitted the participation request. The connection processing includes the protocol start processing for starting a camera network, and the camera network is established if the connection is successful.

In step S608a, the master camera 100 determines whether or not the connection is successful. If the connection is successful (YES in step S608a), the processing by the master camera 100 proceeds to step S609a where the master camera 100 changes the connection status of the slave camera 103 that has transmitted the participation request to "CONNECT" in the camera network management table. Then, the processing by the master camera 100 returns to step S601a. If the connection results in a failure (No in step S608a), the processing by the master camera 100 returns to step S601a at this stage, and steps S601a and S603a are repeated until the master camera 100 receives a participation request again.

The processing described above enables the slave camera, which becomes isolated from the camera network for some reason, to be reconnected to the camera network.

As described above, when wireless communication becomes impossible between the master camera 100 and the slave camera due to, for example, the communication distance of the wireless communication therebetween or an influence of a disturbance, the slave camera actively performs the processing for returning to the camera network. Therefore, even if the master camera 100 cannot detect that the slave camera is isolated, the slave camera automatically performs the return processing, and therefore a user can reconnect the slave camera to the camera network without operating both the master camera 100 and the slave camera.

The present exemplary embodiment has been described taking as an example the situation that wireless communication becomes impossible between the master camera 100 and the slave camera 103 due to, for example, the communication distance of the wireless communication therebetween or an influence of a disturbance. However, the present invention is not limited to this situation, and can be also applied when a slave camera is reconnected to the camera network after being disconnected from the camera network in the situation that the slave camera is shut down and then started up again.

(Processing when the Battery of the Master Camera is Replaced)

Next, the processing will be described, which is performed when the master camera 100 is started up again and reestablishes the camera network after being shut down due to a replacement of the battery 219 which is a power source of the master camera 100 or a replacement of the recording medium 216.

FIG. 7 is a sequence diagram illustrating the processing for reestablishment of the camera network when the battery 219 is replaced at the master camera 100.

Since the processing in step S701 is the same as that in step S501, the description thereof is omitted here.

It is assumed that, in step S702, a user opens a battery cover of a battery storage unit disposed at the master camera 100. At this time, the master camera 100 transmits a disconnection notification indicating an end of the camera network to the slave cameras 101 to 103 by multi-address transmission (multicast), and stops the control of the wireless communication circuit 202.

In steps S703 to 705, the slave cameras 101 to 103 receive the disconnection notification from the master camera 100. In each of the slave cameras 101 to 103, which have received the disconnection notification, the LED drive circuit 225 controls the green LED to be turned off and the red LED to blink.

In step S706, at the master camera 100, a removal of the battery by the user causes a power supply to stop, and thereby all of the controls to stop.

In steps S707, S708, and S709, the slave cameras 101 to 103, which have received the disconnection notification start the processing for returning to the camera network. The processing for returning to the camera network is performed by first establishing wireless communication in the ad-hoc mode with the master camera 100, and then re-participating in the camera network.

It is assumed that, in step S710, the user inserts a battery into the master camera 100. Then, the master camera 100 performs the startup processing for itself.

After the master camera 100 finishes the startup processing, in step S711, the master camera 100 transmits a beacon to establish wireless communication in the ad-hoc mode. Further, the master camera 100 controls the green LED to be turned off and the red LED to blink.

In steps S711 to S713, the slave cameras 101 to 103 receive a beacon, respectively. In steps S714, S715, and S722, the slave cameras 101 to 103, which have received the beacon, determine that the master camera 100 from which they have received the disconnection notification before is now started up again, and reestablish wireless communication in the ad-hoc mode based on the recorded wireless communication parameters.

After the establishment of wireless communication in the ad-hoc mode, insteps S716, S718, and S720, the slave cameras 101 to 103 transmit a request for participation in the camera network to the master camera 100, respectively.

Figure 5:
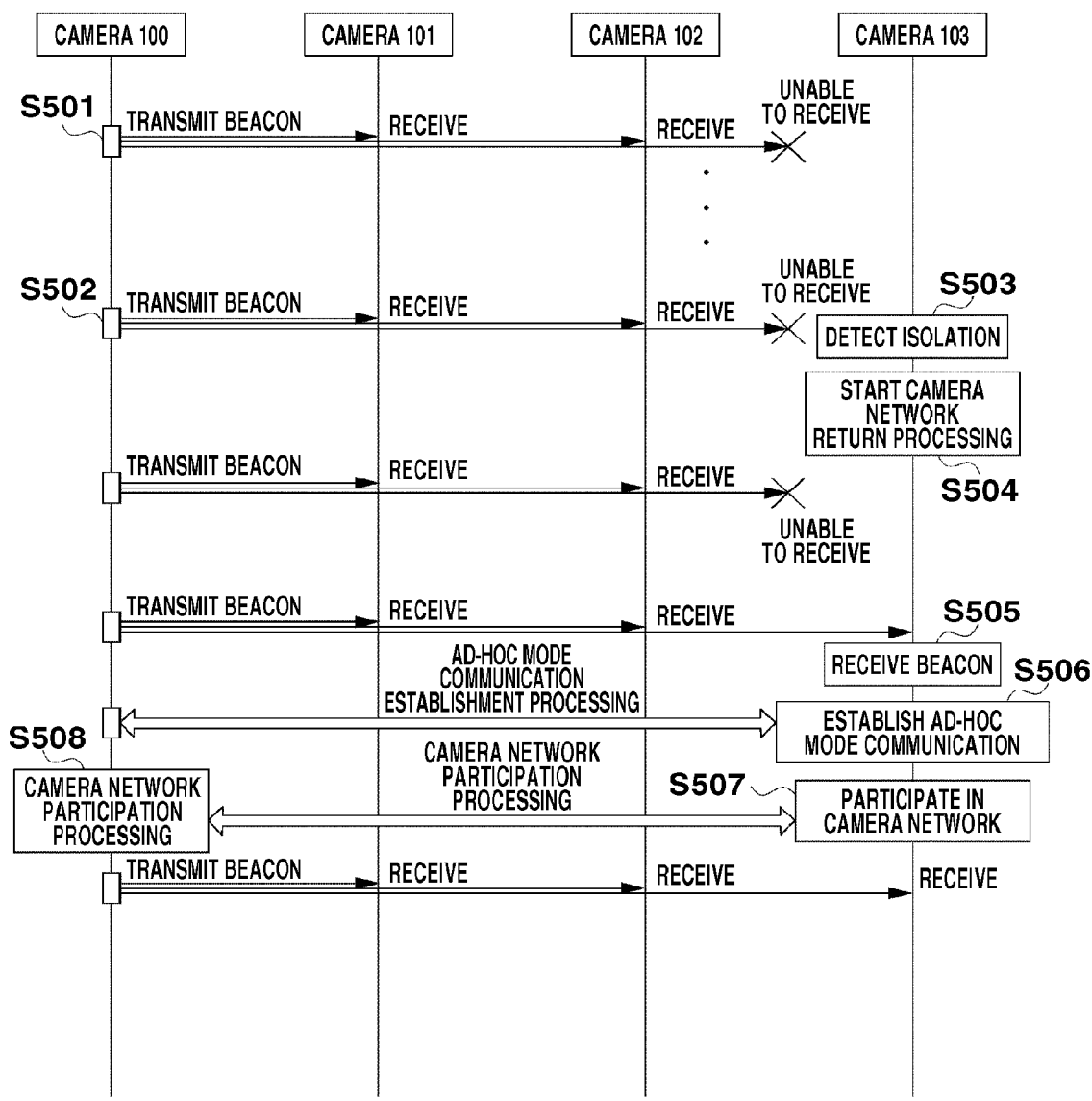
FIG. 5 is a sequence diagram illustrating processing for returning to the camera network according to the first exemplary embodiment.

In steps S717, S719, and S721, the master camera 100 performs the same processing as the processing in step S508 of FIG. 5 to the respective slave cameras 101 to 103, and therefore the description thereof is omitted here.

The details of the processing since the slave cameras 101 to 103 receive a disconnection notification from the master camera 100 after the master camera is shut down, until the slave cameras 101 to 103 return to the camera network after the master camera 100 is started up, are the same as the processing illustrated in the flowchart of FIG. 6.

The processing described above enables the slave cameras 101 to 103 to be reconnected to the camera network after the master camera 100 is started up, even when the camera network is ended due to the master camera 100.

In the present exemplary embodiment, the cameras indicate a status disconnected from/connected to the camera network to a user by lighting up/blinking the green LED and the red LED, but the cameras may indicate that with use of a screen display at the TFT display apparatus 215, which will be now described with reference to FIG. 8.

FIG. 8A illustrates a screen display on the TFT display apparatus 215 of each of the slave cameras 101 to 103 when the slave cameras 101 to 103 receive a camera network end command in steps S703, S704, and S705, respectively.

FIG. 8B illustrates a screen display at the master camera 100 when the master camera 100 is performing the connection processing in step S717 in response to a camera network participation request from the slave camera 101. This screen display shows the nickname of the slave camera 101 "SLAVE 1" to let a user know for which slave camera the maser camera 100 is currently performing the connection processing.

Upon completion of the connection processing, the screen display of FIG. 8D appears. FIG. 8C illustrates a screen display at the slave camera 101 when the slave camera 101 is transmitting a request for participation in the camera network, and is performing the participation processing in step S716. This screen display shows the nickname of the master camera 100 "MASTER" to let a user know to which master camera the slave camera 101 is requesting participation. Upon completion of the connection processing, the screen display of FIG. 8E appears.

As described above, even when the camera network is ended due to the master camera 100, the slave cameras 101 to 103 can participate in the camera network again as soon as the abnormality at the master camera 100 is solved. Therefore, it is possible to cause the slave cameras 101 to 103 to automatically perform the return processing just by rebooting the master camera 100. That is, a user can reestablish the camera network without performing a cumbersome and complicated operation.

The present exemplary embodiment has been described by taking as an example a replacement of the battery at the master camera 100, but the present invention can be also applied when the master camera 100 ends the camera network at the time of, for example, turning off and on of the power switch and a replacement of the recording medium at the master camera 100.

(Processing when the Battery of the Slave Camera is Replaced)

Next, the processing will be described, which is performed when the slave camera 103 is rebooted and is connected again to the camera network after the slave camera 103 is disconnected from the camera network due to, for example, a replacement of the battery 219, which is a power source of the slave camera 103. In this case, the master camera 100 can detect that the slave camera 103 is disconnected from the camera network.

Figure 9:
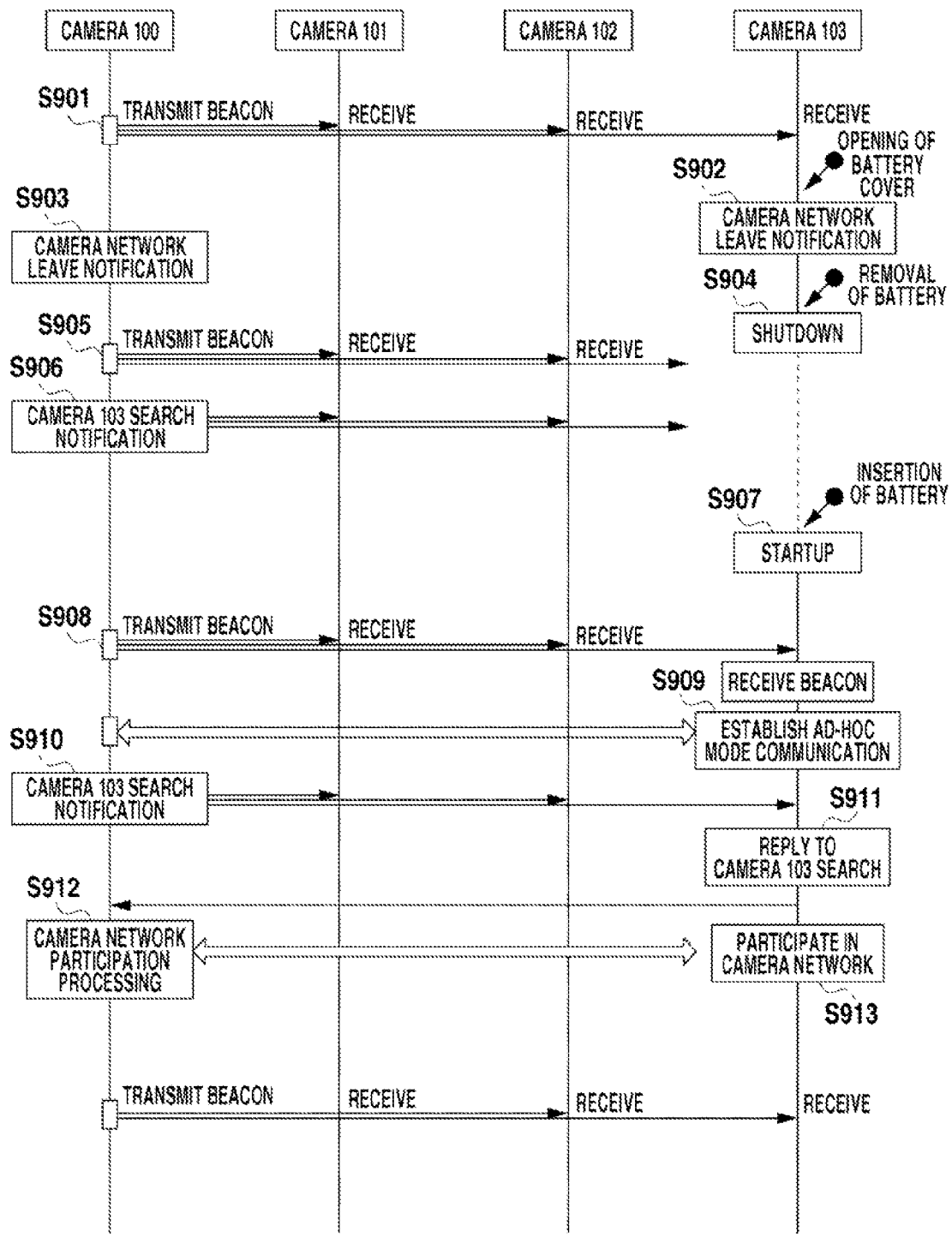
FIG. 9 is a sequence diagram illustrating processing for returning to a camera network according to a third exemplary embodiment.

FIG. 9 is a sequence diagram illustrating the processing for reestablishment of the camera network when the battery is replaced at the slave camera 103.

In step S901, the master camera 100 performs the same processing as the processing in step S501 of FIG. 5, and therefore the description thereof is omitted here.

It is assumed that, in step S902, a user opens a battery cover of a battery storage unit disposed at the slave camera 103. At this time, the slave camera 103 transmits a leave notification indicating that the slave camera 103 is leaving the camera network to the master camera 100, and stops the control of the wireless communication circuit 202.

In step S903, the master camera 100 can detect that the slave camera 103 is disconnected by receiving the leave notification from the slave camera 103. The master camera 100, which has received the leave command, may indicate to a user that the slave camera 103 is disconnected, on the TFT display apparatus 215.

In step S904, in the slave camera 103, a removal of the battery by the user causes a power supply to stop, and thereby all of controls to stop.

In step S905, the master camera 100 continues transmitting a beacon even after the reception of the leave command. The slave cameras 101 and 102 receive the transmitted beacon, whereby the establishment of wireless communication in the ad-hoc mode is maintained.

In step S906, the master camera 100, which has received the leave command, transmits a command for searching the slave camera 103, and enters a wait status for reception of a response from the slave camera 103. At the time of step S906, there is no response from the slave camera 103 because the slave camera 103 is shut down.

It is assumed that, in step S907, the user inserts a battery in the slave camera 103, and therefore the slave camera 103 performs the startup processing for itself. After completing the startup processing, the slave camera 103 controls the green LED to blink.

In steps S908 and S909, the master camera 100 and the slave camera 103 perform the same processing as the processing in steps S711, S713, and S716 of FIG. 5, and therefore the description thereof is omitted here.

After wireless communication in the ad-hoc mode is established, in step S910, the master camera 100 transmits a command for searching the slave camera 103 to the camera network. Since the master camera 100 recognizes that the slave camera 103 is disconnected from the camera network in this case, the master camera 100 can transmit the command by specifying the search target.

When the slave camera 103 receives the command for searching the slave camera 103, in step S911, the slave camera 103 sends back a participation request command.

In step 912, the master camera 100 performs the same processing as the processing in step S508 of FIG. 5, and therefore the description thereof is omitted here.

In this way, in the present exemplary embodiment, in the case that the master camera 100 can detect that the slave camera is disconnected, the master camera 100 searches the slave camera, and the slave camera participates in the network by replying to the search.

Although the exemplary embodiments of the present invention have been described above, it should be understood that the present invention is not limited to those embodiments and various changes and modifications thereof could be made without departing from the spirit or scope of the invention.

Further, the present invention can be also embodied by performing the following procedure. That is, the a software (or program) capable of carrying out the functions of the above-described exemplary embodiments is supplied to a system or an apparatus through a network or various kinds of recording media, and a computer (or, for example, a CPU or micro processing unit (MPU)) of the system or the apparatus reads out and executes the program.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. A communication apparatus configured to wirelessly establish a network with a control apparatus, the communication apparatus comprising:
 a transmission unit configured to transmit a participation request for participation in the network;
 a reception unit configured to receive a signal from the control apparatus that has received the participation request;
 a notification unit configured to notify the control apparatus of pulling out of the network if the communication apparatus pulls out of the network;
 a determination unit configured to determine, during a time from when the communication apparatus participates in the network to when the notification unit notifies the control apparatus of pulling out of the network, whether the communication apparatus pulls out of the network, based on a reception status of the signal; and
 a control unit configured to perform control, if the determination unit determines that the communication apparatus pulls out of the network, to start processing for participating in the network again without causing the notification unit to notify the control apparatus of pulling out of the network,
 wherein the control unit performs control to participate in the network again by causing the transmission unit to re-transmit the participation request.

2. The communication apparatus according to claim 1, wherein the determination unit determines that the communication apparatus pulls out of the network, if the reception unit does not receive the signal for a predetermined time.

3. The communication apparatus according to claim 1, further comprising a display unit configured to display a pulling out of the network if the determination unit determines that the communication apparatus pulls out of the network.

4. The communication apparatus according to claim 1, wherein the request for participation is transmitted by broadcast transmission.

5. The communication apparatus according to claim 1, wherein the communication apparatus does not transmit a reply to the signal regularly transmitted from the control apparatus.

6. The communication apparatus according to claim 1, further comprising an image capturing unit configured to capture an image of an object to obtain image data,
 wherein the reception unit is further configured to receive an instruction for capturing by the image capturing unit from the control apparatus.

7. A control apparatus configured to wirelessly establish a network with a communication apparatus, the control apparatus comprising:
 a first reception unit configured to receive a participation request for participation in the network from the communication apparatus;
 a second reception unit configured to receive a pull out request for pulling out of the network from the communication apparatus; and
 a cancellation unit configured to cancel, if the participation request is received from the communication apparatus from which the pull out request has not been received, the participation in the network by the communication apparatus from which the pull out request has not been received, without causing the communication apparatus to transmit the pull out request,
 wherein the control apparatus performs control such that the communication apparatus participates in the network again after the cancellation unit cancels the participation.

8. The control apparatus according to claim 7, wherein a plurality of communication apparatuses can participate in the network, and wherein the cancellation unit cancels the participation in the network by the communication apparatus, which has transmitted the participation request, without pulling other communication apparatuses out of the network.

9. The control apparatus according to claim 8, wherein the control apparatus periodically transmits a beacon to establish the network.

10. The control apparatus according to claim 7, further comprising a storing unit configured to store connection status information relating to the status of a connection between the communication apparatus and the network,
wherein the cancellation unit cancels the participation in the network by the communication apparatus by changing the connection status information stored by the storing unit to indicate that the communication apparatus pulls out of the network.

11. The control apparatus according to claim 10, wherein the storing unit stores a plurality of pieces of information of participation status in the network by a plurality of communication apparatuses, and
wherein the cancellation unit changes, among the plurality of pieces of information of connection status between the plurality of communication apparatuses and the network stored by the storing unit, the connection status of the communication apparatus, which has transmitted the participation request, to "not connected" without changing the connection status of other communication apparatuses.

12. The control apparatus according to claim 10, wherein the cancellation unit further changes, in response to the pull out request received by the second reception unit from the communication apparatus, the connection status of the communication apparatus to "not connected".

13. The control apparatus according to claim 7, further comprising an instruction unit configured to instruct the communication apparatus to execute imaging processing while the network is established.

14. The control apparatus according to claim 7, further comprising:
a participation unit configured to participate in the network generated by the communication apparatus;
an imaging unit configured to capture an image of an object to generate image data; and
a reception unit configured to receive, during the participation in the network generated by the communication apparatus, an instruction from the communication apparatus for executing imaging processing.

15. The control apparatus according to claim 7, further comprising a setting unit configured to set whether the control apparatus operates as a device for transmitting a control signal to the communication apparatus to cause the communication apparatus to execute processing, or operates as a device for receiving a control signal from the communication apparatus to execute processing.

16. A method performed by a communication apparatus for wirelessly establishing a network with a control apparatus, the method comprising:
transmitting a participation request for participation in the network;
receiving a signal from the control apparatus that has received the participation request;
notifying the control apparatus of pulling out of the network if the communication apparatus pulls out of the network;
determining, during a time from participating in the network to notifying the control apparatus of pulling out of the network, whether the communication apparatus pulls out of the network, based on a reception status of the signal;
performing control, if it is determined that the communication apparatus pulls out of the network, to start processing for participating in the network again without notifying the control apparatus of pulling out of the network; and
performing control to participate in the network again by re-transmitting the participation request.

17. A method performed by a control apparatus for wirelessly establishing a network with an communication apparatus, the method comprising:
receiving a participation request for participation in the network from the communication apparatus;
receiving a pull out request for pulling out of the network from the communication apparatus;
cancelling, if the participation request is received from the communication apparatus from which the pull out request has not been received, the participation in the network by the communication apparatus from which the pull out request has not been received, without causing the communication apparatus to transmit the pull out request; and
performing control such that the communication apparatus participates in the network again after the cancelling.

* * * * *